(12) United States Patent
Adamson et al.

(10) Patent No.: US 9,790,837 B2
(45) Date of Patent: Oct. 17, 2017

(54) MOUNTING ASSEMBLY FOR A DIESEL OXIDATION CATALYST SYSTEM OF A WORK VEHICLE

(71) Applicant: CNH Industrial America, LLC, New Holland, PA (US)

(72) Inventors: William Adamson, Naperville, IL (US); Eric Wanstrath, Downers Grove, IL (US); Mark Draeger, Oak Creek, WI (US); Rajeshwar Adupala, Hyderabad (IN)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/587,635

(22) Filed: May 5, 2017

(65) Prior Publication Data

US 2017/0234203 A1    Aug. 17, 2017

Related U.S. Application Data

(62) Division of application No. 14/513,276, filed on Oct. 14, 2014, now Pat. No. 9,662,968.

(60) Provisional application No. 61/939,856, filed on Feb. 14, 2014.

(51) Int. Cl.
*B60K 13/04*    (2006.01)
*F01N 13/18*    (2010.01)
*F01N 3/10*    (2006.01)

(52) U.S. Cl.
CPC ......... *F01N 13/1805* (2013.01); *F01N 3/103* (2013.01); *F01N 13/1838* (2013.01); *F01N 2450/24* (2013.01); *F01N 2590/08* (2013.01)

(58) Field of Classification Search
None
See application file for complete search history.

(56) References Cited

U.S. PATENT DOCUMENTS

| | | | |
|---|---|---|---|
| 7,517,380 B2 * | 4/2009 | Grimm | B01D 46/001 180/89.2 |
| 7,870,725 B2 * | 1/2011 | Hazelton | F01N 13/1805 138/135 |

(Continued)

FOREIGN PATENT DOCUMENTS

JP    2013123952 A    6/2013

*Primary Examiner* — Jacob Knutson
*Assistant Examiner* — Hilary L Johns
(74) *Attorney, Agent, or Firm* — Rickard K. DeMille; Rebecca L. Henkel

(57) ABSTRACT

A mounting assembly for mounting a diesel oxidation catalyst (DOC) system within a work vehicle may generally include a support bracket having a first side and a second side. The mounting assembly may also include a mount plate configured to be coupled to the first side of the bracket. The mount plate may include first and second plate walls and may define an elongated slot through the first plate wall. Additionally, the assembly may include a retention band configured to at least partially wrap around a housing of the DOC system between a first end configured to be coupled to the mount plate and a second end configured to be coupled to the second side of the support bracket. The mount plate may be configured to be moved laterally relative to the support bracket to allow the retention band to be tightened and loosened around the housing.

4 Claims, 7 Drawing Sheets

(56) References Cited

U.S. PATENT DOCUMENTS

| | | | | |
|---|---|---|---|---|
| 7,926,604 B2* | 4/2011 | Ammer | B60K 13/04 | |
| | | | 180/309 | |
| 8,246,709 B2* | 8/2012 | Franken | F01N 13/1805 | |
| | | | 285/406 | |
| 8,297,048 B2* | 10/2012 | Biedler | F01N 3/28 | |
| | | | 60/299 | |
| 8,418,448 B2* | 4/2013 | Kamata | B60K 5/1208 | |
| | | | 60/299 | |
| 8,695,748 B2* | 4/2014 | Togo | B60K 5/00 | |
| | | | 180/309 | |
| 8,701,387 B2* | 4/2014 | Saito | F01N 3/0211 | |
| | | | 422/177 | |
| 8,721,977 B2* | 5/2014 | Wikaryasz | F01N 13/141 | |
| | | | 422/179 | |
| D706,203 S * | 6/2014 | Gibson | D12/223 | |
| 8,820,691 B2* | 9/2014 | Bednarz | F01N 13/1822 | |
| | | | 123/65 A | |
| 8,875,500 B2* | 11/2014 | Bednarz | E02F 9/0866 | |
| | | | 248/201 | |
| 8,915,071 B2* | 12/2014 | Mitsuda | F01N 13/00 | |
| | | | 60/285 | |
| 8,915,328 B2* | 12/2014 | Okada | E02F 9/0866 | |
| | | | 180/309 | |
| D722,003 S * | 2/2015 | Gibson | D12/223 | |
| 8,943,813 B2* | 2/2015 | Kamei | E02F 9/0866 | |
| | | | 60/286 | |
| 8,943,816 B2* | 2/2015 | Bednarz | F01N 13/1822 | |
| | | | 248/672 | |
| 8,950,179 B2* | 2/2015 | Rao | F01N 3/2066 | |
| | | | 181/243 | |
| 9,011,782 B2* | 4/2015 | Baig | F01N 3/2066 | |
| | | | 422/168 | |
| 9,050,559 B2* | 6/2015 | Denis | B01D 53/86 | |
| 9,057,316 B2* | 6/2015 | Golin | F01N 13/1805 | |
| 9,140,174 B2* | 9/2015 | Wikaryasz | F01N 13/1822 | |
| 9,295,946 B2* | 3/2016 | Lamps | F01N 13/008 | |
| 9,546,587 B2* | 1/2017 | Kobe | F01N 13/007 | |
| 9,644,522 B2* | 5/2017 | Gudorf | F01N 13/008 | |
| 2008/0054128 A1 | 3/2008 | Ivarsson et al. | | |
| 2011/0120085 A1 | 5/2011 | Saito et al. | | |
| 2011/0215220 A1 | 9/2011 | Loebig | | |
| 2012/0011833 A1 | 1/2012 | Kamei et al. | | |
| 2012/0017574 A1 | 1/2012 | Hasan et al. | | |
| 2012/0305112 A1 | 12/2012 | Mitsuda | | |
| 2013/0213725 A1 | 8/2013 | Togo et al. | | |

* cited by examiner

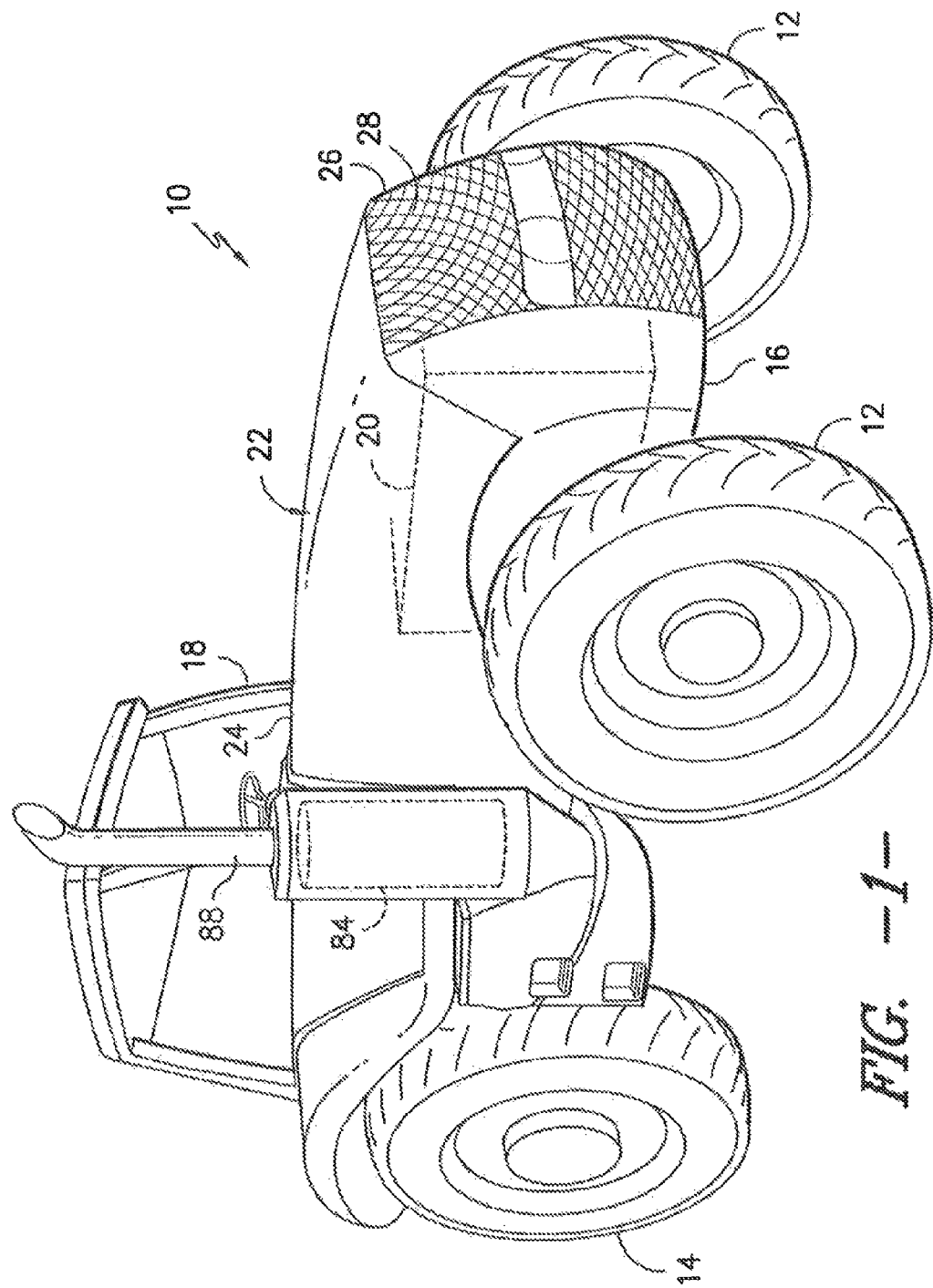
FIG. -1-

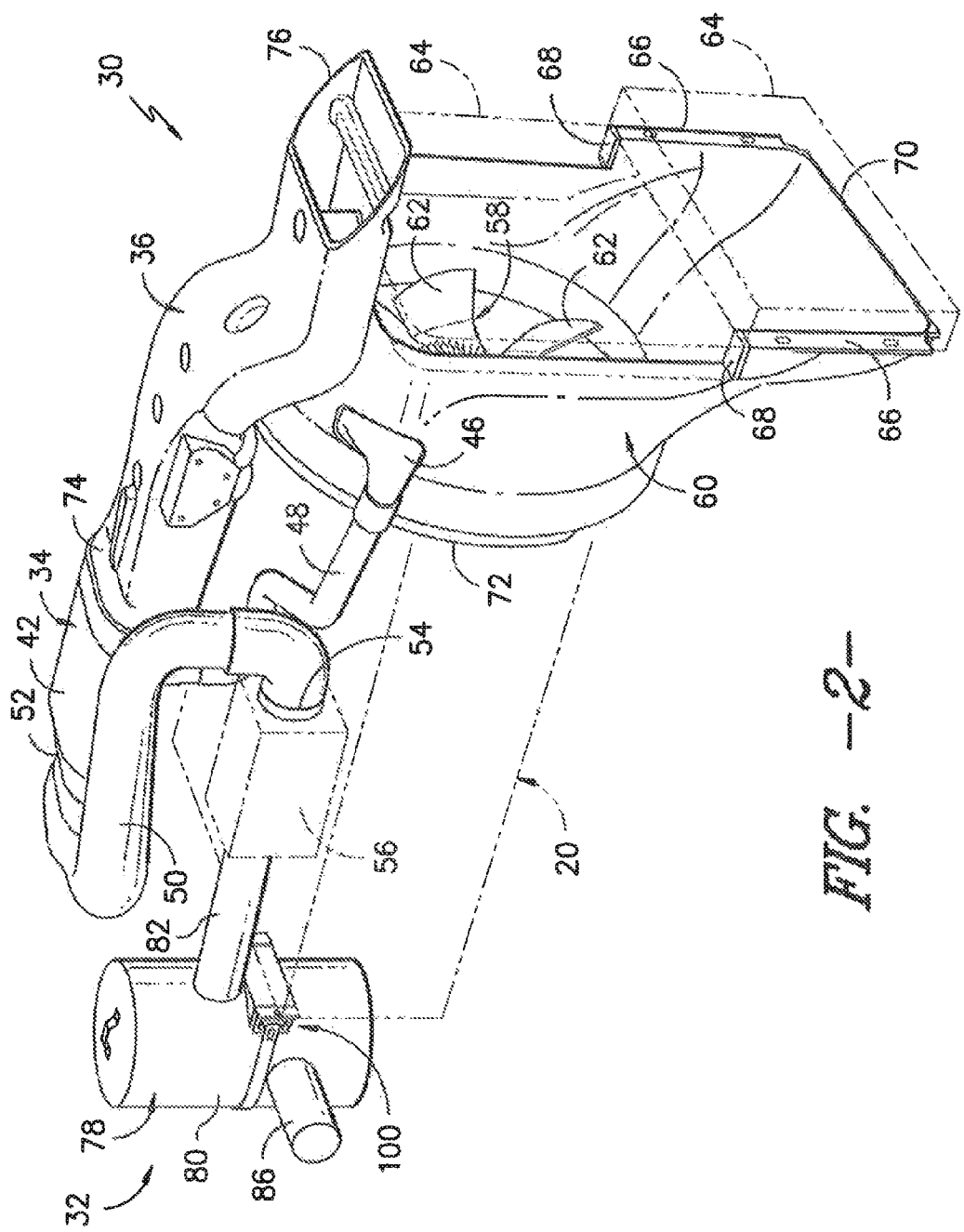

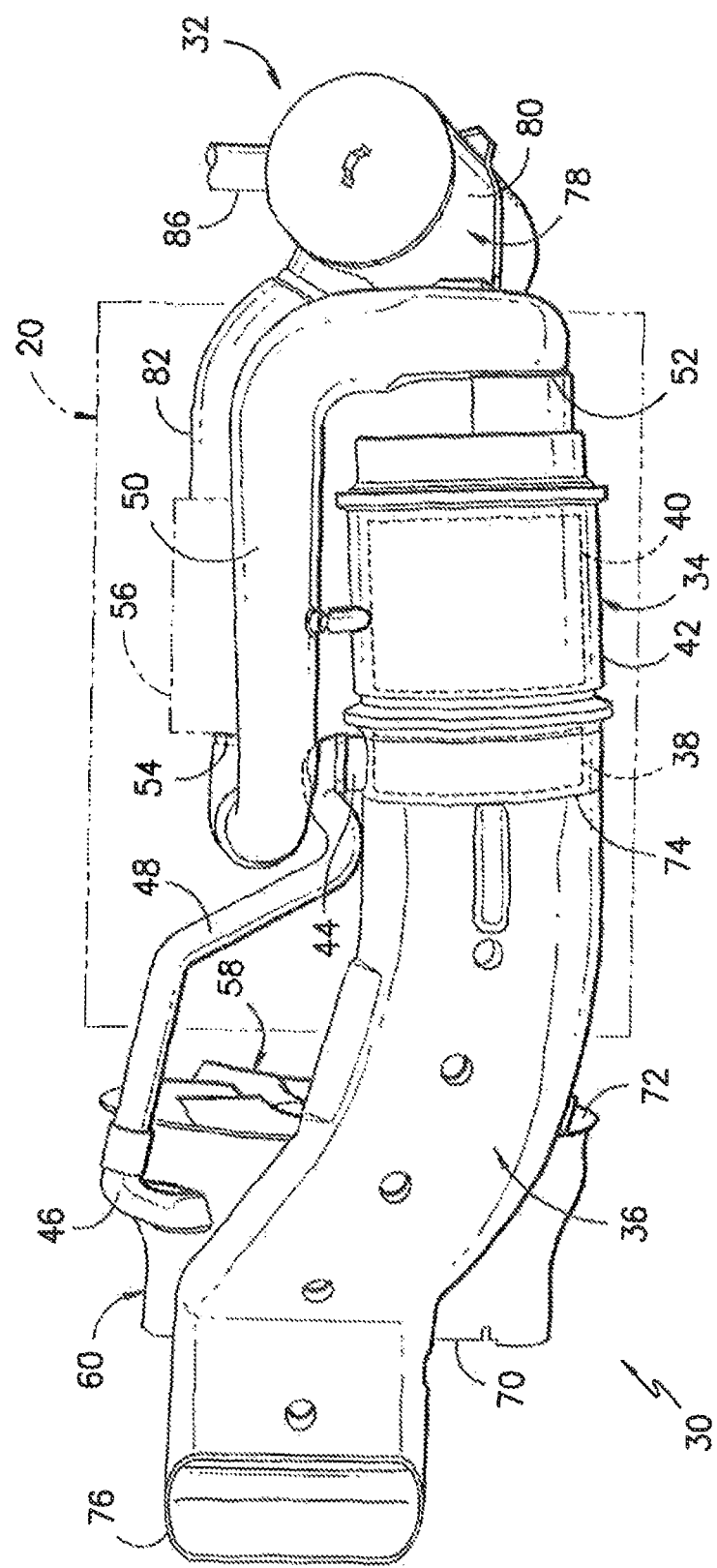
FIG. -3-

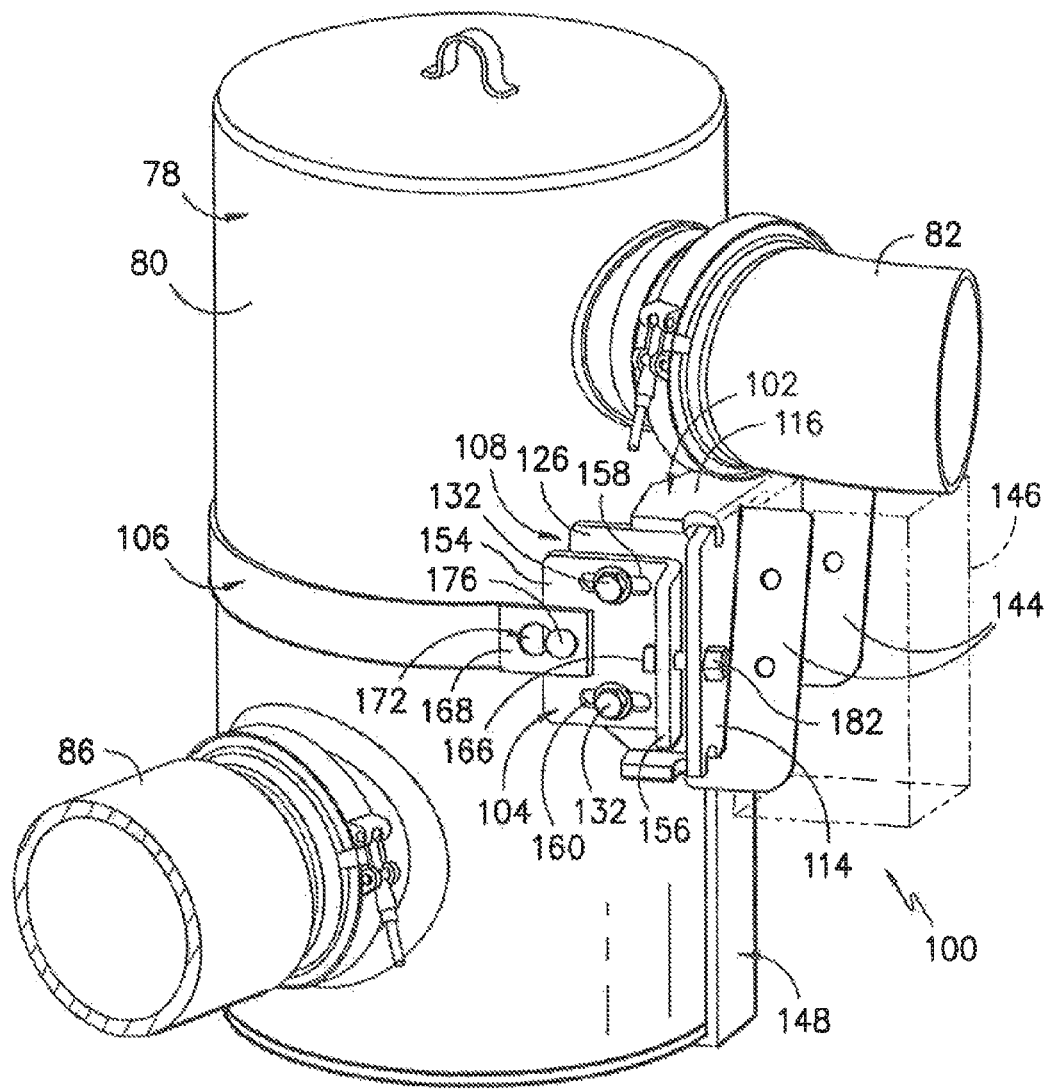
FIG. —4—

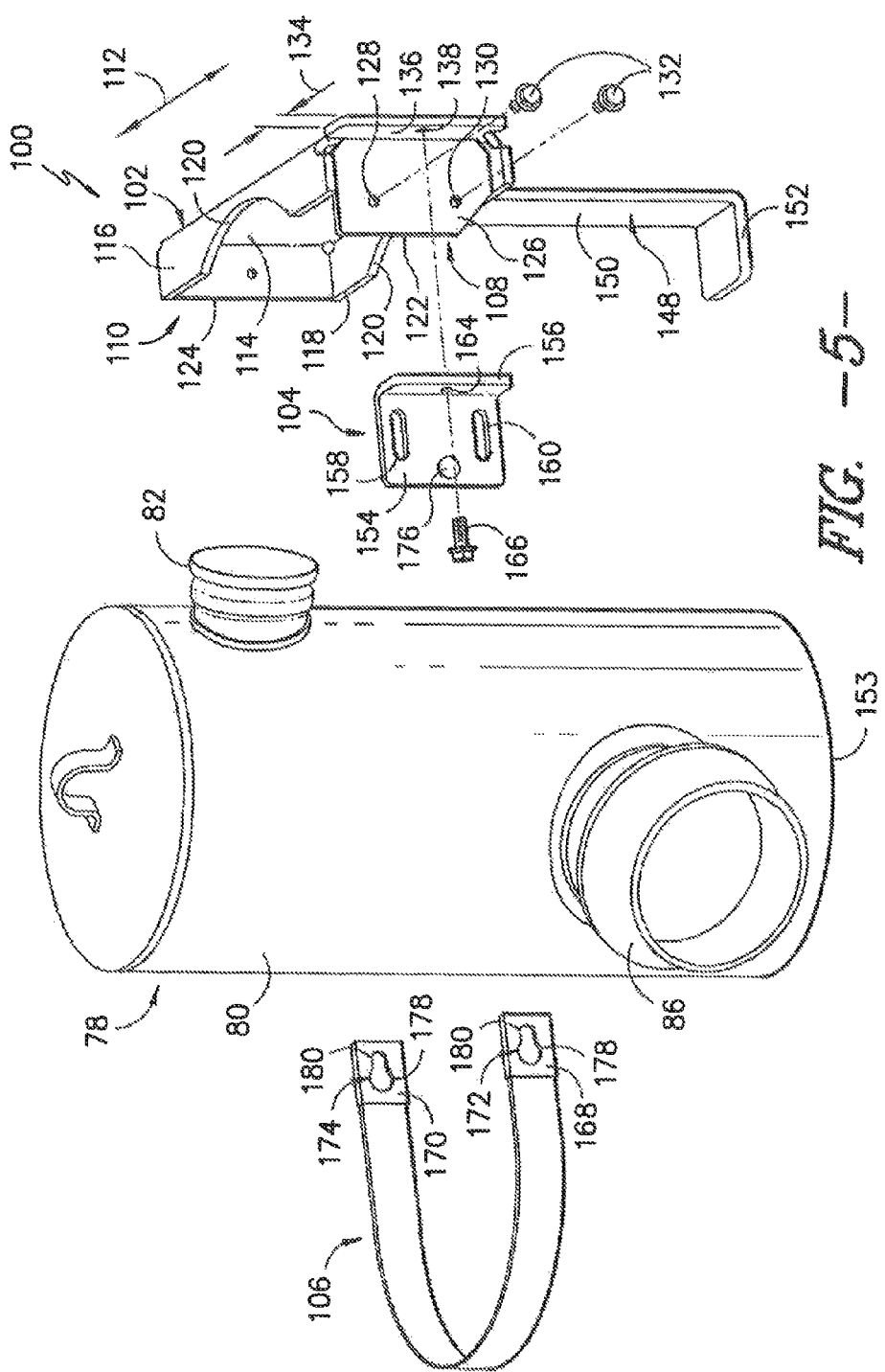
FIG. -5-

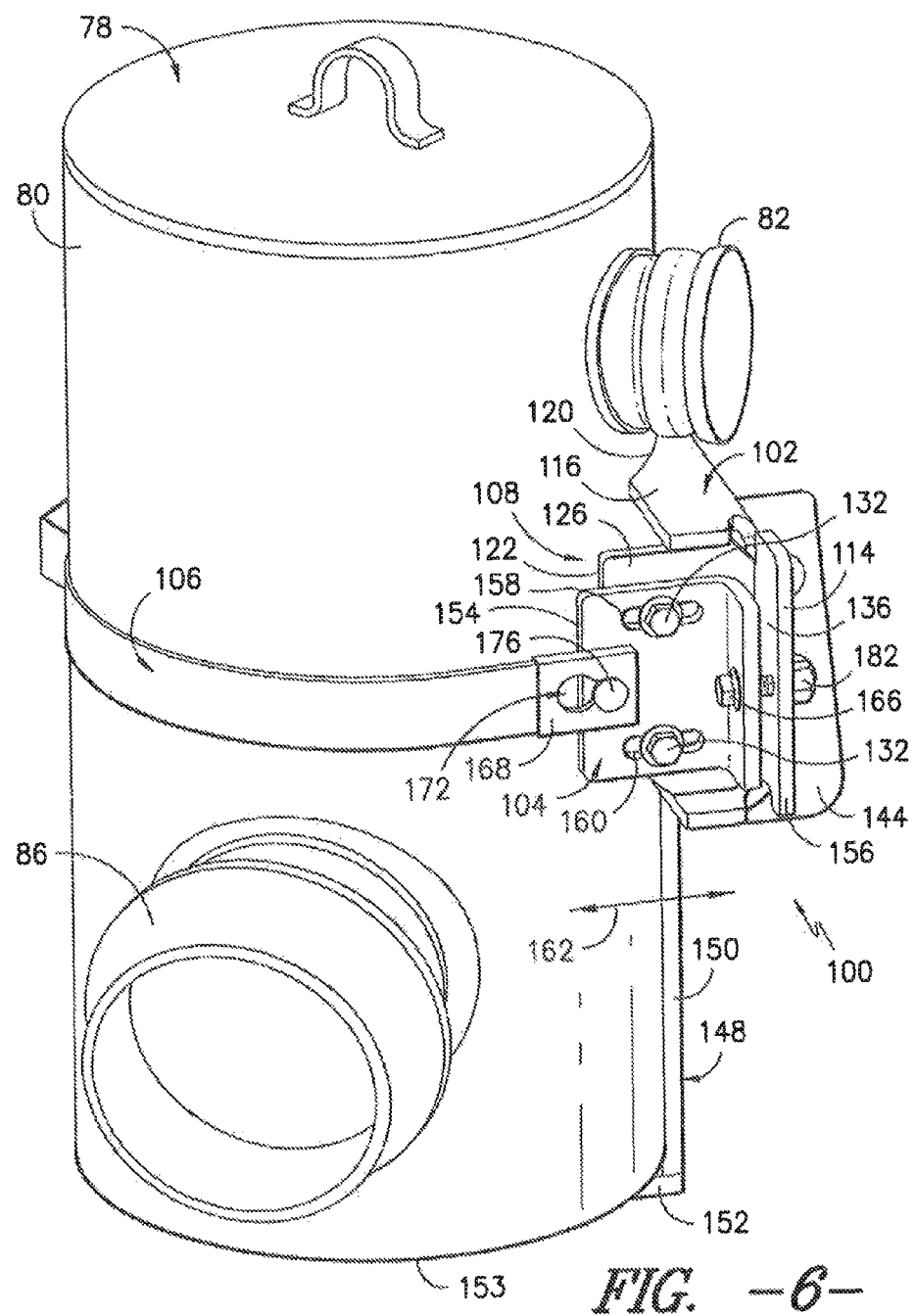
FIG. -6-

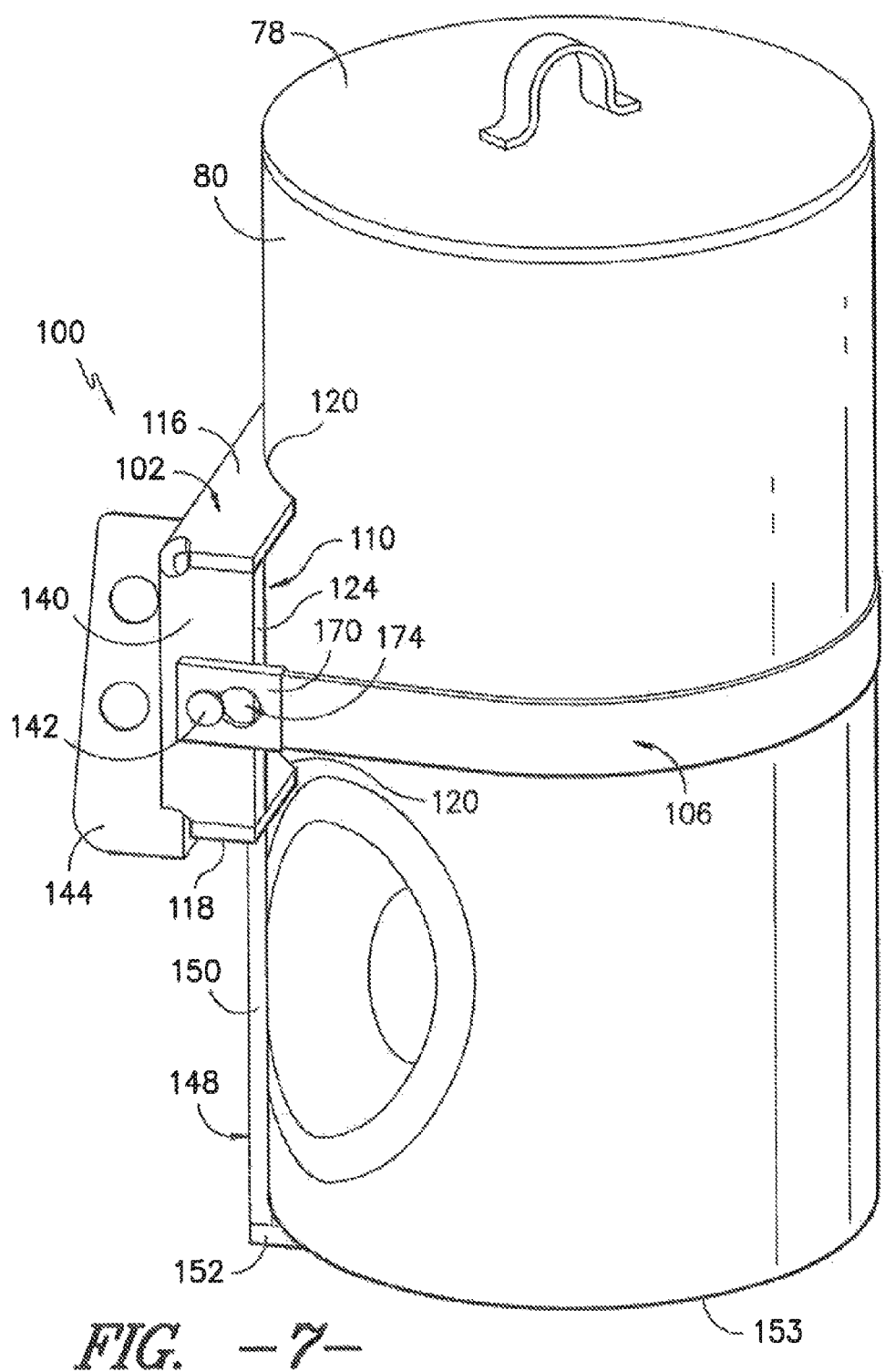
FIG. —7—

MOUNTING ASSEMBLY FOR A DIESEL OXIDATION CATALYST SYSTEM OF A WORK VEHICLE

CROSS REFERENCE TO RELATED APPLICATIONS

This application is a divisional of and claims the right of priority to U.S. patent application Ser. No. 14/513,276, filed on Oct. 14, 2014, which, in turn, is based upon and claims priority to U.S. Provisional Patent Application No. 61/939,856, filed on Feb. 14, 2014, the disclosures of both which are hereby incorporated by reference herein in their entirety for all purposes.

FIELD OF THE INVENTION

The present subject matter relates generally to work vehicles and, more particularly, to a mounting assembly for a diesel oxidation catalyst (DOC) system of a work vehicle.

BACKGROUND OF THE INVENTION

Typically, work vehicles, such as tractors and other agricultural vehicles, include an exhaust treatment system for controlling engine emissions. As is generally understood, exhaust treatment systems for work vehicles often include a DOC system in fluid communication with a selective catalytic reduction (SCR) system. The DOC system generally includes a cylindrical housing containing one or more catalysts configured to oxidize carbon monoxide and unburnt hydrocarbons contained within the engine exhaust. The DOC housing may also define a mixing chamber for mixing an exhaust reductant, such as a diesel engine fluid (DEF) reductant or any other suitable urea-based fluid, into the engine exhaust. For instance, the exhaust reductant is often pumped from a reductant tank mounted on and/or within the vehicle and injected onto the mixing chamber to mix the reductant with the engine exhaust. The resulting mixture may then be supplied to the SCR system to allow the reductant to be reacted with a catalyst in order to reduce the amount of nitrous oxide (NOx) emissions contained within the engine exhaust.

The DOC system must typically be mounted as close as possible to the engine to allow for minimal heat loss as the engine exhaust flows from the engine to the DOC system. However, the DOC housing is often quite large, thereby making it difficult to mount the housing within the small amount of open space available within the engine compartment. As a result, mounting assemblies have been developed that allow the DOC system to be mounted under the hood adjacent to the engine. Unfortunately, conventional mounting assemblies for DOC systems often require one or more of the mounting components to be sub-assembled onto the DOC housing prior to installing the housing within the engine compartment or are otherwise complex and/or difficult to assemble, thereby significantly increasing assembly times at the associated vehicle manufacturing plant.

Accordingly, an improved mounting assembly that allows for a DOC system to be quickly and easily mounted at a suitable under-hood location of a work vehicle would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a mounting assembly for mounting a diesel oxidation catalyst (DOC) system at an under-hood location of a work vehicle. The mounting assembly may generally include a support bracket having a first side and a second side opposite the first side. The first side may define a first mounting surface and a second mounting surface. The support bracket may also include a first fastener opening defined through the first mounting surface. The mounting assembly may also include a mount plate configured to be coupled to the first side of the support bracket. The mount plate may include a first plate wall configured to extend adjacent to the first mounting surface and a second plate wall configured to extend adjacent to the second mounting surface. The mount plate may define an elongated slot through the first plate wall. In addition, the mounting assembly may include a retention band configured to at least partially wrap around a housing of the DOC system. The retention band extending may extend between a first end and a second end. The first end may be configured to be coupled to the mount plate and the second end may be configured to be coupled to the second side of the support bracket. When a fastener is inserted through the elongated slot and into the first fastener opening, the mount plate may be configured to be moved laterally relative to the first mounting surface to allow the retention band to be tightened and loosened around the housing.

In another aspect, the present subject matter is directed to a work vehicle including an engine and a diesel oxidation catalyst (DOC) system configured to receive engine exhaust from the engine. The DOC system may include a housing. The work vehicle may also include a mounting assembly configured for mounting the DOC system at an under-hood location of a work vehicle. The mounting assembly may generally include the various components indicated above and described in greater detail below.

In a further aspect, the present subject matter is directed to a method for mounting a diesel oxidation catalyst (DOC) system at an under-hood location of a work vehicle using a mounting assembly including a support bracket, a mount plate and a retention band. The support bracket may extend between a first side and a second side disposed opposite the first side. The mount plate may be configured to be coupled to the first side of the support bracket and may include a first plate wall configured to extend adjacent to the first mounting surface and a second plate wall configured to extend adjacent to the second mounting surface. The method may generally include positioning a housing of the DOC system adjacent to the support bracket, coupling one end of the retention band to the second side of the support bracket and coupling an opposite end of the retention band to the mount plate and moving the mount plate laterally relative to the first mounting surface in order to tighten the retention band around the housing.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a work vehicle;

FIG. 2 illustrates a front perspective view of various components of an air intake system and an exhaust treatment system suitable for use with the work vehicle shown in FIG. 1;

FIG. 3 illustrates a top view of the components shown in FIG. 2;

FIG. 4 illustrates a perspective view of one embodiment of a mounting assembly for mounting a diesel oxidation catalyst (DOC) system at any suitable under-hood location of a work vehicle, particularly illustrating the DOC system secured to the mounting assembly;

FIG. 5 illustrates an exploded view of the mounting assembly shown in FIG. 4;

FIG. 6 illustrates another perspective view of the mounting assembly and the DOC system shown in FIG. 4, particularly illustrating the attachment configuration for the mounting assembly along a first side of the assembly; and FIG. 7 illustrates a further perspective view of the mounting assembly and the DOC system shown in FIG. 4, particularly illustrating the attachment configuration for the mounting assembly along a second side of the assembly.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of one embodiment of a work vehicle 10. As shown, the work vehicle 10 is configured as an agricultural tractor. However, in other embodiments, the work vehicle 10 may be configured as any other suitable work vehicle known in the art, such as various other agricultural vehicles (e.g., combines), earth-moving vehicles, road vehicles, loaders and/or the like.

As shown in FIG. 1, the work vehicle 10 includes a pair of front wheels 12, a pair or rear wheels 14 and a chassis 16 coupled to and supported by the wheels 12, 14. An operator's cab 18 may be supported by a portion of the chassis 16 and may house various control devices (not shown) for permitting an operator to control the operation of the work vehicle 10. Additionally, the work vehicle 10 may include an engine 20 and a transmission (not shown) mounted on the chassis 16. The transmission may be operably coupled to the engine 20 and may provide variably adjusted gear ratios for transferring engine power to the wheels 14 via a differential (not shown).

The work vehicle 10 may also include a hood 22 configured to extend between an aft end 24 disposed adjacent to the cab 18 and a forward end 26 defining a grille 28 at the front of the work vehicle 10. As is generally understood, the hood 22 may be configured to least partially surround and/or cover various under-hood components of the wok vehicle 10, such as the engine 20 and any other suitable under-hood components (e.g., hydraulic components, pneumatic components, electrical components, mechanical component(s), storage tank(s), etc.). As will be described below, various components of an air intake system 30 and an exhaust cleaning system 32 of the work vehicle 10 may also be housed within, installed underneath and/or otherwise positioned vertically below the hood 22.

Referring now to FIGS. 2 and 3, differing views of at least a portion of an air intake system 30 and an exhaust cleaning system 32 suitable for use with the work vehicle 10 shown in FIG. 1 are illustrated in accordance with aspects of the present subject matter. Specifically, FIG. 2 illustrates a perspective view of various components of the air intake and exhaust cleaning systems 30, 32. Additionally, FIG. 3 illustrates a top view of the components shown in FIG. 2.

As shown, the air intake system 30 may generally include a filter assembly 34 configured to receive dirty air from an intake duct 36 and clean/filter such air for subsequent delivery to the engine 20 (shown in phantom lines). In general, the filter assembly 34 may include a pre-cleaner (indicated by dashed box 38 in FIG. 3) and an air filter (indicated by dashed box 40 in FIG. 3) disposed downstream of the pre-cleaner 38. In addition, the filter assembly may include a housing 42 configured to house or otherwise encase the pre-cleaner 38 and the air filter 40.

As is generally understood, the pre-cleaner 38 may be configured to remove portions of the dust, dirt, debris, plant matter and other particulates contained within the air flowing into the filter assembly 34 via the intake duct 36. Specifically, in several embodiments, the pre-cleaner 38 may include one or more tubes (e.g., turbo tubes), dirt separators, and/or any other suitable pre-cleaner elements (not shown) configured to separate large particulates from the air via centripetal force. For example, the pre-cleaner element(s) may be configured to impart a vortex or spinning motion to the flow of air entering the filter assembly 34. As a result, the large particulates contained within the air may be forced radially outwardly along the inner wall of the housing 42 by the centripetal force of the vortex/spinning motion. Such particulates may then be expelled from the filter assembly 34 via a scavenge port 44 (FIG. 3) defined through the housing 42 along the outer perimeter of the pre-cleaner 38. For example, as will be described below, an aspiration scoop(s) 46 may be in flow communication with the scavenge port 44 via an aspiration conduit 48 to allow large particulates to be removed from the pre-cleaner 38.

Additionally, the air filter 40 may generally be configured to receive the cleaned air flowing from the pre-cleaner 38 and filter such air to provide a final stage of filtering prior to delivery of the air to the engine 20. Thus, the air filter 40 may generally include one or more filter elements (not shown) configured to catch or trap the remaining particulates contained within the cleaned air. For instance, in several embodiments, the filter element(s) may be made from a fibrous, porous or mesh material that allows air to pass therethrough while catching/trapping any particulates. The cleaned/filtered air may then be directed through a suitable output conduit 50 to the engine 20, where the air may be mixed with fuel and combusted. For instance, as shown in FIGS. 2 and 3, the output conduit 50 may extend from an output end 52 of the filter assembly 34 to an intake end 54 of a turbocharger 56 of the engine 20.

As shown in the illustrated embodiment, the air intake system 30 may also include a fan 58 and a fan shroud 60 configured to encase or otherwise surround the fan 58. In general, the fan 58 may include a plurality of fan blades 62 configured to be rotated so as to draw air through the front grille 28 (FIG. 1) of the work vehicle 10, thereby providing an airflow across one or more heat exchangers 64 (shown in phantom lines) positioned between the fan 58 and the front grille 28. For example, as shown in FIG. 2, heat exchangers 64 may be mounted to and/or otherwise supported by the fan shroud 60 at a location upstream of the fan 58 via suitable mounting flanges 66 and/or support pads 68 positioned at the front of the shroud 60. Thus, as air is drawn through the front grille 28 and is directed towards the fan 58, at least a portion of the air may pass through the upstream heat exchanger(s) 64.

It should be appreciated that the fan 58 may be configured to be rotatably driven using any suitable drive means known in the art. For instance, in one embodiment, the fan 58 may be coupled to an output shaft (not shown) of the engine 20. In another embodiment, the fan 58 may be rotatably driven by any other suitable drive means, such as by using a separate drive motor rotatably coupled to the fan 58.

It should also be appreciated that the fan shroud 60 may generally be configured to define a passageway for the air drawn through the heat exchanger(s) 64 by the fan 58. For example, as shown in the illustrated embodiment, the fan shroud 60 may define a shroud inlet 70 disposed adjacent to the heat exchanger(s) 64 and a shroud outlet 72 disposed aft of the fan 58. As such, the air passing through the heat exchanger(s) 64 may be received by the shroud inlet 70 and expelled from the fan shroud 60 via the shroud outlet 72. Additionally, as particularly shown in FIG. 2, the fan shroud 60 may, in one embodiment, be configured to transition from a generally rectangular shape at the shroud inlet 70 to a generally circular shape at the shroud outlet 72. As such, the rectangular opening defined by the shroud inlet 70 may be configured to capture the air flowing through the generally rectangular-shaped heat exchanger(s) 64 while the circular portion of the fan shroud 60 extending towards the shroud outlet 72 may be configured to encase or surround the fan blades 62. However, it should be appreciated that, in alternative embodiments, the fan shroud 60 may have any other suitable configuration/shape that permits it to function as described herein.

Additionally, in several embodiments, the aspiration scoop 46 of the air intake system 30 may be configured to extend through a portion of the fan shroud 60 such that an outlet opening (not shown) of the scoop 46 is positioned within the fan shroud 60 directly upstream of the fan 58. As such, when the fan 58 is rotated, a vacuum may be applied through the aspiration scoop 46 to allow large particulates to be sucked from the pre-cleaner 38 via the scavenge port 44. The particulates may then flow through the aspiration conduit 48 to the aspiration scoop 46 and may subsequently be expelled into the fan shroud 60 via the scoop's outlet opening.

Moreover, as shown in FIGS. 2 and 3, in several embodiments, a portion of the intake duct 36 may be configured to extend directly above the fan shroud 60. For example, the intake duct 36 may generally extend between a first end 74 in flow communication with the pre-cleaner 38 and an open second end 76 positioned directly upstream of the shroud inlet 70. As particularly shown in FIG. 2, the second end 76 of the intake duct 36 may generally define an elongated opening to allow air to be captured by the intake duct 36 as it flows through the front grille 28.

Referring still to FIGS. 2 and 3, the exhaust treatment system 32 of the work vehicle 10 may generally include a diesel oxidation catalyst (DOC) system 78 and a selective catalytic reduction (SCR) system 84 (FIG. 1). As is generally understood, the DOC system 78 may include a cylindrically shaped DOC housing 80 configured to house one or more catalysts (not shown) that serve to oxidize carbon monoxide and unburnt hydrocarbons contained within engine exhaust received from the vehicle's engine 20. For instance, as shown in FIGS. 2 and 3, a suitable exhaust conduit 82 may be coupled between the engine 20 and the DOC housing 80 to allow engine exhaust to be directed into the DOC system 78. In addition, a mixing chamber (not shown) may be defined within the DOC housing 80 to allow the exhaust flow to be mixed with at least one reductant, such as a diesel exhaust fluid (DEF) reductant or any other suitable urea-based reductant, supplied into the housing 80.

The SCR system 84 may generally be in flow communication with the DOC system 78 to allow the exhaust/reductant mixture expelled from the DOC system 78 to be supplied to the SCR system 84. For example, as shown in FIGS. 2 and 3, a conduit 86 (only a portion of which is shown) may be configured to extend between the DOC system 78 and the SCR system 84 for supplying the exhaust/reductant mixture to the SCR system 84. As is generally understood, the SCR system 84 may be configured to reduce the amount of nitrous oxide (NOx) emissions contained within the flow of engine exhaust using a suitable catalyst (not shown) that reacts with the reductant to convert the NOx emissions into nitrogen, water and carbon dioxide ($CO_2$). The cleaned exhaust flow may then be discharged from the SCR system 84 and expelled into the surrounding environment (e.g., via an exhaust pipe 88 (FIG. 1) of the work vehicle 10).

Additionally, as shown particularly shown in FIG. 2, the exhaust treatment system 32 may also include a mounting assembly 100 configured for mounting the DOC system under the vehicle's hood at a location adjacent to the engine 22 (e.g., at a location directly behind the engine 22). As will be described below, the various components of the mounting assembly 100 may be configured such that the DOC system 32 may be easily and efficiently mounted in place, thereby reducing the overall assembly time required for installing the various under-hood components within the work vehicle 10.

Referring now to FIGS. 4-7, various views of one embodiment of the mounting assembly 100 are illustrated in accordance with aspects of the present subject matter. Specifically, FIG. 4 illustrates a perspective view of the mounting assembly 100 with the DOC system 32 mounted thereto. FIG. 5 illustrates an exploded view of the mounting assembly 100 and DOC system 32 shown in FIG. 4. FIGS. 6 and 7 illustrates differing perspective views of the mounting assembly 100 an DOC system 32 shown in FIG. 4, with FIG. 6 illustrating one side of the mounting assembly 100 and FIG. 7 illustrating the opposite side of the mounting assembly 100.

As shown in the illustrated embodiment, the mounting assembly 100 may generally include a support bracket 102 and a mount plate 104 configured to be coupled to the support bracket 102. In addition, the mounting assembly 100 may include a retention band 106 configured to be coupled between the support bracket 102 and the mount plate 104 such that the band 106 extends circumferentially around at least a portion of the DOC housing 80.

In general, the support bracket 102 may correspond to any suitable structural component that allows the DOC system 78 to be supported within the vehicle 10 at any suitable under-hood location (e.g., at a location directly behind the engine 22). For example, in several embodiments, the support bracket 102 may include a first side 108, a second side 110 and one or more walls extending crosswise (indicated by arrow 112 in FIG. 5) between the first and second sides 108, 110. Specifically, as shown in FIG. 5, the support bracket 102 includes a back wall 114 extending between the first and second sides 108, 110. In addition, the support bracket 114 may include an upper wall 116 and a lower wall 118 extending generally perpendicularly from the back wall 114 between the first and second sides 108, 110. As particularly shown in FIG. 5, in one embodiment, each of the upper and lower walls 116, 118 may define an arced or curved recess 120 configured to receive a portion of the cylindrically shaped DOC housing 80 when the housing 80 is positioned against the support bracket 102. Moreover, the support bracket 102 may include a first sidewall 122 extending from the back wall 114 along the first side 108 of the bracket 102 and a second sidewall 124 extending from the back wall 114 along the second side 110 of the bracket 102.

In several embodiments, the first sidewall 112 may generally define a first mounting surface 126 along the first side 108 of the support bracket 102 and may include one or more fastener openings 128, 130 defined therethrough for receiving suitable mechanical fasteners 132. For example, as shown in FIG. 5, an upper fastener opening 128 and a lower fastener opening 130 may be defined through the first sidewall 122, with each fastener opening 128, 130 being configured to receive a mechanical fastener 132. Additionally, in several embodiments, the first sidewall 122 may be configured to extend outwardly from the back wall 114 at a location spaced apart from the end of the back wall 114 by distance 134 (FIG. 5). Thus, as shown in FIG. 5, the portion of the back wall 144 projecting outwardly beyond the first sidewall 122 along the first side 106 of the support bracket 102 may define a second mounting surface 136 extending substantially perpendicularly to the first mounting surface 126. As shown in the illustrated embodiment, one or more fastener openings 138 may also be defined through the second mounting surface 136 for receiving a suitable fastener(s) 138.

Moreover, as particularly shown in FIG. 7, the second sidewall 124 may generally define an attachment surface 140 along the second side 110 of the support bracket 102. As will be described below, an attachment pin 142 may be configured to extend or project outwardly from the attachment surface 140 such that the retention band 106 may be coupled to the second side 110 of the support bracket 102 via the pin 142.

As particularly shown in FIG. 4, the support bracket 102 may also, in several embodiments, include or more support arms 144 projecting outwardly from the back wall 114. In general, the support arm(s) 144 may be configured for mounting the support bracket 102 to another structural component of the work vehicle (indicated by phantom lines 146 in FIG. 4), such as a separate mounting bracket coupled directly or indirectly to the chassis 16 of the work vehicle 10 (FIG. 1).

Additionally, as shown in the illustrated embodiment, the support bracket 102 may include a support leg 148 extending from the bracket 102 between the first and second sides 108, 110. Specifically, as shown in FIG. 5, the support leg 148 may generally include a top portion 150 extending vertically downwardly from the back wall 114 of the support bracket 102 and bottom portion 152 extending generally perpendicularly from the top portion 150. In such an embodiment, the support leg 148 may be configured to vertically support the DOC housing 78 when the housing 78 is mounted to the support bracket 102. For example, as shown in FIGS. 6 and 7, the bottom portion 152 may be configured to extend under and contact a bottom surface 153 of the DOC housing 78 when the housing 78 is positioned directly adjacent to the support bracket 102, thereby allowing the support leg 148 to provide vertical support for the housing 78.

Referring still to FIGS. 4-7, the mount plate 104 of the mounting assembly 100 may generally be configured to be coupled to the first side 108 of the support bracket 102. Specifically, in several embodiments, the mount plate 104 may include a first plate wall 154 and a second plate wall 156. The first plate wall 154 may generally be configured to be coupled to the first sidewall 122 of the support bracket 102 such that the first plate wall 154 extends along and/or adjacent to the first mounting surface 126 when the mount plate 104 is coupled to the support bracket 102. Similarly, the second plate wall 156 may generally be configured to be coupled to the portion of the back wall 114 extending outwardly beyond the first sidewall 122 such that the second plate wall 156 extends along and/or adjacent to the second mounting surface 136 when the mount plate 104 is coupled to the support bracket 102.

In several embodiments, the first plate wall 154 may define one or more elongated slots 158, 160 configured to be aligned with the corresponding fastener openings 128, 130 defined through the first sidewall 122. Specifically, as shown in FIG. 5, the first plate wall 154 may include an upper elongated slot 158 configured to be aligned with the upper fastener opening 128 and a lower elongated slot 160 configured to be aligned with the lower fastener opening 130. As such, when suitable fasteners 142 are inserted through the elongated slots 158, 160 and into the corresponding fastener openings 128, 130 without being fully tightened, the mount plate 104 may be configured to be moved laterally (indicated by arrow 162 in FIG. 6) relative to the support bracket 102. Specifically, the elongated slots 158, 160 may allow the mount plate 104 to be moved laterally relative to the first mounting surface 126 in a direction both towards and away from the second mounting surface 136. As will be described below, such lateral movement of the mount plate 104 relative to the support bracket 102 may allow for the retention band 106 to be tightened and/or loosened around the DOC housing 80.

Additionally, in several embodiments, the second plate wall 156 may define one or more wall openings 164 configured to be aligned with the corresponding fastener opening(s) 138 defined through the second mounting surface 136. Specifically, as shown in FIG. 5, the second plate wall 156 may include a wall opening 164 configured to be aligned with the fastener opening 138 defined through the portion of the back wall 144 extending outwardly relative to the first sidewall 122. As such, a suitable fastener 166 may be inserted through the wall opening 164 and into the corresponding fastener opening 138 to couple the second plate wall 156 to the support bracket 102. As will be described below, by tightening the fastener 166 extending through such aligned opening 138, 164s, the mount plate 104 may be pulled laterally towards the second mounting surface 136 in order to tighten the retention band 106 around the DOC housing 80.

Referring still to FIGS. 4-7, the retention band 106 of the mounting assembly 100 may generally correspond to a narrow band or strip of material (e.g., a narrow metal band) or any suitable elongated component or cable that is capable of extending circumferentially around at least a portion of the DOC housing 80. As shown in the illustrated embodiment, the retention band 106 may extend lengthwise between a first end 168 and a second end 170. The first end 168 may generally be configured to be coupled to the mount plate 104 while the second end 170 may generally be configured to be coupled to the second side 110 of the support bracket 102 such that the band 106 wraps around the DOC housing 80 between such attachment locations.

For example, in several embodiments, an attachment opening 172, 174 may be defined at each end 168, 170 of the retention band 106 for coupling the band 106 to the mount plate 104 and the support bracket 102. Specifically, as indicated above, the support bracket 102 may include an attachment pin 142 (FIG. 7) projecting outwardly from the second sidewall 124. Additionally, as shown in FIG. 5, the mount plate 104 may also include an attachment pin 176 projecting outwardly from the first plate wall 154. In such an embodiment, each attachment opening 172, 174 may be configured to receive a portion of the corresponding attachment pin 142, 176 to allow the retention band 106 to be coupled between the mount plate 104 and the support bracket 102. For example, as shown in FIG. 5, each attachment opening 172, 174 includes a first portion 178 defining an enlarged opening and a second portion 180 defining a narrow slot. Thus, to secure the retention band 106 to the attachment pins 142, 176, the ends 168, 170 of the band 106 may be aligned within the attachment pins 142, 176 such that an enlarged head of each pin 142, 176 is received within the enlarged first portion 178 of each corresponding attachment opening 172, 174. Thereafter, relative movement between the retention band 106 and the attachment pins 142, 176 may allow for each attachment pin 142, 176 to be received within the narrower second portion 180 of each opening 172, 174 such that the enlarged head is engaged against each end 168, 170 of the retention band 106.

It should be appreciated that, in one embodiment, the retention band 106 may also include a band clamp (not shown) disposed between its first and second ends 168, 170. In such an embodiment, the retention band 106 may be divided into two separate band segments that are coupled together via the band clamp. The band clamp may then be used, when necessary, to tighten or loosen the retention band 106 around the DOC housing 80. For instance, as is generally understood, band clamps typically include a captive screw extending between separate clamp components coupled to the ends of a segmented band that permits the band to be tightened or loosened by rotating the screw in order to move the clamp components towards or away from one another.

Referring still to FIGS. 4-7, a method for mounting a DOC system 78 at an under-hood location of a work vehicle 10 using the disclosed mounting assembly 100 will now be described. As indicated above, the support bracket 102 of the mounting assembly 100 may be configured to be coupled to a separate structural component 146 of the work vehicle 10. Thus, in several embodiments, the support bracket 102 may be initially secured to such structural component 146 (e.g., via the support arms 144 extending form the back wall 114 of the support bracket 102). In addition, the first plate wall 154 mount plate 102 may be loosely mounted to the first side 108 of the support bracket 102. Specifically, suitable fasteners 132 may be loosely installed through the elongated slots 158, 160 and corresponding fastener openings 128, 130 such that the mount plate 104 is capable of being moved laterally relative to the support bracket 102.

Thereafter, the DOC housing 80 may be positioned adjacent to the support bracket 102. As indicated above, when the DOC housing 80 is positioned directly adjacent to the bracket 102, a portion of the housing 80 may be received within the curved recesses 120 defined by the upper and lower walls 116, 118 of the support bracket 102. In addition, the bottom surface 153 of the DOC housing 80 may be engaged against the bottom portion 152 of the support leg 148 extending from the support bracket 102, thereby allowing the housing 80 to be vertically supported relative to the bracket 102 while the installation is being completed.

Once the DOC housing 80 is properly positioned relative to the support bracket 102, the retention band 106 may be installed around the housing 80. Specifically, the second end 170 of the retention band 106 may be coupled to the second side 110 of the support bracket 106 by inserting the attachment pin 142 within the first portion 178 of the corresponding attachment opening 174 and by pulling the band 106 away from the attachment pin 142 such that the pin 142 is received within the second portion 180 of the attachment opening 174. To allow the first end 170 of the retention band 106 to be coupled to the mount plate 104, the mount plate 104 may, in one embodiment, be moved relative support bracket 102 in a direction away from the second mounting surface 136 to the extent allowed by the fasteners 132 extending through the elongated slots 158, 160. Thereafter, the first end 170 of the retention band 106 may be moved over the attachment pin 176 extending from the mount plate 104 to allow the pin 176 to be inserted within the corresponding attachment opening 172.

To complete the installation, a suitable fastener 166 may then be inserted through both the wall opening 164 defined in the second plate wall 156 of the mount plate 104 and the corresponding fastener opening 138 defined through the second mounting surface 136 of the support bracket 102. As the fastener 166 is tightened (e.g., via a nut 182 (FIG. 6) installed onto the fastener 166 along the back wall 114), the mount plate 104 is pulled in the direction of the second mounting surface 136, thereby tightening the retention band 106 around the DOC housing 80. Once the retention band 106 is fully tightened around the housing 80, the fasteners 132 extending through the elongated slots 158, 160 may then be tightened to finalize the assembly.

It should be appreciated that, although the mounting method disclosed above was described with reference to steps being performed in a particular order, the methods steps may generally be performed in any suitable order that is consistent with the disclosure provided herein. Specifically, the disclosed mounting assembly 100 may generally be assembled together and/or relative to a DOC system 78 in any suitable order that allows the assembly 100 to be used to mount DOC system 78 at a suitable under-hood location of a work vehicle 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for mounting a diesel oxidation catalyst (DOC) system at an under-hood location of a work vehicle using a mounting assembly including a support bracket, a mount plate and a retention band, the support bracket extending between a first side and a second side disposed opposite the first side, the mount plate being configured to be coupled to the first side of the support bracket and including a first plate wall configured to extend adjacent to the first mounting surface and a second plate wall configured to extend adjacent to the second mounting surface, the method comprising:

positioning a housing of the DOC system adjacent to the support bracket;

coupling one end of the retention band to the second side of the support bracket;

coupling an opposite end of the retention band to the mount plate; and moving the mount plate laterally relative to the first mounting surface in order to tighten the retention band around the housing.

2. The method of claim 1, wherein a second fastener opening is defined through the second mounting surface of the support bracket and the mount plate includes a wall opening defined through the second plate wall that is configured to be aligned with the second fastener opening, wherein moving the mount plate laterally relative to the first mounting surface comprises tightening a second fastener extending through the second fastener opening and the wall opening such that mount plate is moved laterally relative to the first mounting surface in a direction towards the second mounting surface.

3. The method of claim 2, wherein the first plate wall of the mount plate defines an elongated slot configured to be aligned with a first fastener opening defined through the first mounting surface of the support bracket, the method further comprising:

inserting a first fastener through the elongated slot and into the first fastener opening; and tightening the first fastener relative to the first wall and the first mounting surface after the second fastener is tightened.

4. The method of claim 1, wherein the mounting assembly further comprises a support leg extending outwardly from the support bracket between the first and second sides, wherein positioning the housing of the DOC system adjacent to the support bracket comprises positioning the housing adjacent to the support bracket such that the housing is supported vertically by a bottom portion of the support leg.

\* \* \* \* \*